(12) United States Patent
Uratani et al.

(10) Patent No.: US 9,815,502 B1
(45) Date of Patent: Nov. 14, 2017

(54) OPERATOR'S COMPARTMENT OF WORK MACHINE, AND WORK MACHINE

(71) Applicant: KOMATSU LTD., Tokyo (JP)

(72) Inventors: Yuuki Uratani, Hirakata (JP); Masayuki Hirabayashi, Oumihachiman (JP); Kuniharu Shimada, Oumihachiman (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/247,207

(22) Filed: Aug. 25, 2016

(30) Foreign Application Priority Data

Apr. 28, 2016 (JP) ................................. 2016-091224

(51) Int. Cl.
*B62D 33/06* (2006.01)
*B60J 5/04* (2006.01)
*B60J 7/16* (2006.01)
*B60J 9/02* (2006.01)

(52) U.S. Cl.
CPC ........ *B62D 33/0617* (2013.01); *B60J 5/0487* (2013.01); *B60J 7/1642* (2013.01); *B60J 9/02* (2013.01)

(58) Field of Classification Search
CPC ........ B62D 33/06; B62D 33/0617; B60J 5/04; B60J 5/0487; B60J 7/16; B60J 7/1642; B60J 9/002

USPC .................................................... 296/190.11
See application file for complete search history.

(56) References Cited

U.S. PATENT DOCUMENTS

| 4,119,340 A * | 10/1978 | Wolfe | B60J 7/1621 296/190.1 |
|---|---|---|---|
| 4,415,197 A | 11/1983 | Meyer | |
| 5,137,327 A * | 8/1992 | Edmonds | B60J 9/02 16/259 |
| 6,688,682 B2 * | 2/2004 | Arthur | B60J 7/1642 296/216.02 |
| 9,193,246 B2 * | 11/2015 | Wood | B60H 1/245 |
| 2007/0063549 A1 * | 3/2007 | Sap | B60H 1/00378 296/216.01 |
| 2011/0233963 A1 * | 9/2011 | Yamashita | B62D 33/0617 296/190.11 |

* cited by examiner

*Primary Examiner* — Gregory Blankenship
(74) *Attorney, Agent, or Firm* — Drinker Biddle & Reath LLP

(57) ABSTRACT

A support member has a first wing plate and a second wing plate coupled to the first wing plate to be pivotable relative to the first wing plate. A fixing member fixes the first wing plate to an opening member from an external space external to an operator's compartment and is also removed from the first wing plate to allow the first wing plate and the opening member to be unfixed. A fixing member fixes the second wing plate to a panel from an internal space of the operator's compartment and is also removed from the panel to allow the second wing plate and the panel to be unfixed.

6 Claims, 9 Drawing Sheets

OPERATOR'S COMPARTMENT OF WORK MACHINE, AND WORK MACHINE

BACKGROUND OF THE INVENTION

Field of the Invention

The present invention relates to an operator's compartment of a work machine, and the work machine.

Description of the Background Art

A forestry machine such as a feller buncher is often operated on a sloping ground. In case that the feller buncher has been tipped over, an emergency escapeway (e.g., a roof escape hatch) other than a door is provided to the operator's compartment (cab) of the feller buncher.

An escapeway from the inside of a vehicular, operator's compartment is described for example in U.S. Pat. No. 4,415,197. In U.S. Pat. No. 4,415,197, an opening of the ceiling of the operator's compartment ceiling is opened and closed by a hatch. The hatch is coupled with the operator's compartment by a hinge. When the hatch opens the opening, the hatch is held in a position which is erect relative to the ceiling of the operator's compartment.

An emergency escapeway provided to a work machine is required to be capable of being opened and closed from both the inside and outside of the operator's compartment. Such an emergency escapeway is required to allow a small occupied area to ensure a prescribed opening dimension.

SUMMARY OF INVENTION

The present invention has been made in view of the above issue, and an object thereof is to provide an operator's compartment of a work machine that can be opened and closed from both an internal space of the operator's compartment and an external space external to the operator's compartment and facilitate allowing a small occupied area to ensure a prescribed opening dimension, and the work machine.

The operator's compartment of the work machine of the present invention includes an operator's compartment, a panel, a support member, a first fixing member, and a second fixing member. The operator's compartment has an internal space and an opening connecting the internal space to an external space external to the operator's compartment. The panel is disposed at the opening. The support member has a first member and a second member coupled with the first member to be able to change a positional relationship with respect to the first member. The first fixing member is capable of fixing the first member to the operator's compartment from one of the internal space of the operator's compartment and the external space and is capable of releasing a fixing state between the first member and the operator's compartment by being removed from the operator's compartment and the first member. The second fixing member is capable of fixing the second member to the panel from the other of the internal space of the operator's compartment and the external space and is capable of releasing a fixing state between the second member and the panel by being removed from the panel and the second member.

According to the operator's compartment of the work machine of the present invention, the first fixing member fixes the first member to the operator's compartment from one of the internal space of the operator's compartment and the external space. Accordingly, by removing the first fixing member from one of the spaces, the fixing state between the first member and the operator's compartment can be released and the panel can be removed from the operator's compartment.

Furthermore, the second fixing member fixes the second member to the panel from the other of the internal space of the operator's compartment and the external space. Accordingly, by removing the second fixing member from the other of the spaces, the fixing state between the second member and the panel can be released and the panel can be removed from the operator's compartment.

Thus, an operation to attach/remove the panel to/from the operator's compartment can be done from both the internal space of the operator's compartment and an external space external thereto.

Furthermore, the operator's compartment of the work machine of the present invention has a simple configuration in which the panel is disposed to be capable of opening and closing the opening, which facilitates allowing a small occupied area to ensure a prescribed opening dimension.

Furthermore, sealing between the panel and the operator's compartment can prevent water from entering the internal space of the operator's compartment via the opening and can easily prevent water from entering the internal space.

In the operator's compartment of the work machine as described above, the first member and the second member are pivotably coupled together. The support member has a spring member. The spring member biases the first member and the second member in a direction allowing the first and second members to pivot.

Accordingly, by removing one of the first fixing member and the second fixing member, the first member pivots relative to the second member. Accordingly, when the panel is attached to the operator's compartment, and removed therefrom, the first member and the second member can be prevented from interfering with the panel and the operator's compartment.

In the operator's compartment of the work machine as described above, a coupling portion of the first member and the second member is located in the opening in a plan view.

Accordingly, when the panel is attached to the operator's compartment, and removed therefrom, the first member and the second member can be prevented from interfering with the panel and the operator's compartment.

In the operator's compartment of the work machine as described above, the first fixing member and the first member are fixed to each other by screw connection, and the second fixing member and the panel are fixed to each other by screw connection. Thus coupling via a screw ensures and also simplifies fixing.

Furthermore, screw connection allows an operation in an emergency for an escape to be done by a simple and rapid as well as reliable operation.

In the operator's compartment of the work machine as described above, the first fixing member fixes the first member to the operator's compartment from the external space external to the operator's compartment, and the second fixing member fixes the second member to the panel from the internal space of the operator's compartment. A head of a screw of the first fixing member is located in the external space external to the operator's compartment, and a head of a screw of the second fixing member is located in the internal space of the operator's compartment.

As the screws' heads are located in the internal space of the operator's compartment and the external space, respectively, an operation to attach/remove the panel to/from the operator's compartment can be done from both the internal space of the operator's compartment and the external space.

A work machine of the present invention includes the operator's compartment of the work machine as described above, and a work implement.

The work machine of the present invention that includes the above described operator's compartment can be opened and closed from both the inside and outside of the operator's compartment, facilitate allowing a small occupied area to ensure a prescribed opening dimension, and also prevent water from entering the operator's compartment.

Thus the present invention can implement an operator's compartment of a work machine that can be opened and closed from both the inside and outside of the operator's compartment, facilitate allowing a small occupied area to ensure a prescribed opening dimension, and prevent water from entering the operator's compartment, and the work machine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will now be described in embodiments hereinafter with reference to the drawings.

Initially, a configuration of a work machine in one embodiment of the present invention will be described. Hereinafter, a feller buncher as an example of a work machine to which an idea of the present invention is applicable, and an operator's compartment used for the feller buncher will be described using FIG. 1 and FIG. 2. Note that other than a feller buncher, the present invention is also applicable to a work machine having an operator's compartment, such as a hydraulic excavator, a crawler dozer, and a wheel loader.

Figure 1:
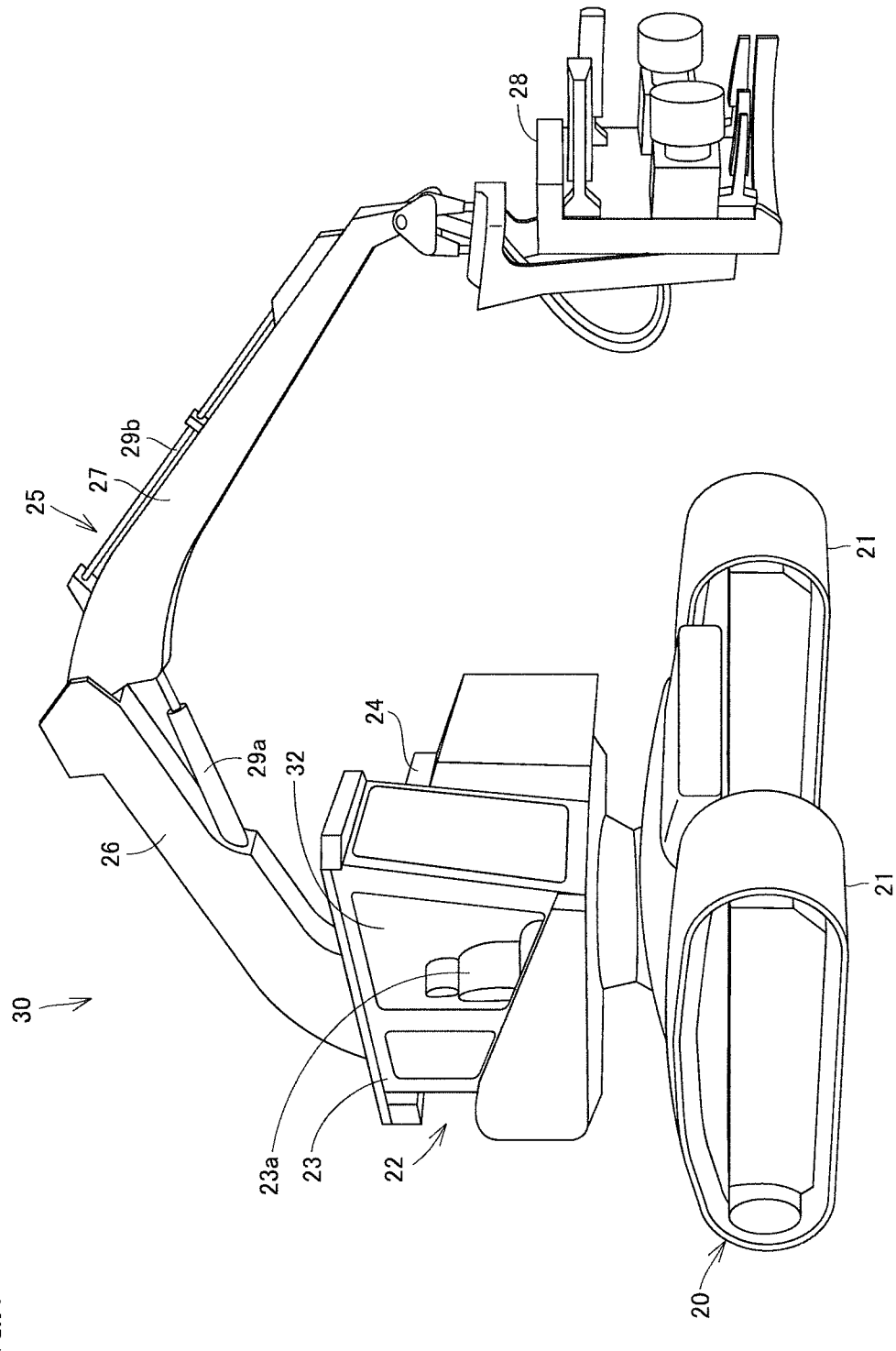
FIG. 1 is a perspective view schematically showing a configuration of a feller buncher as an example of a work machine in one embodiment of the present invention.
Figure 2:
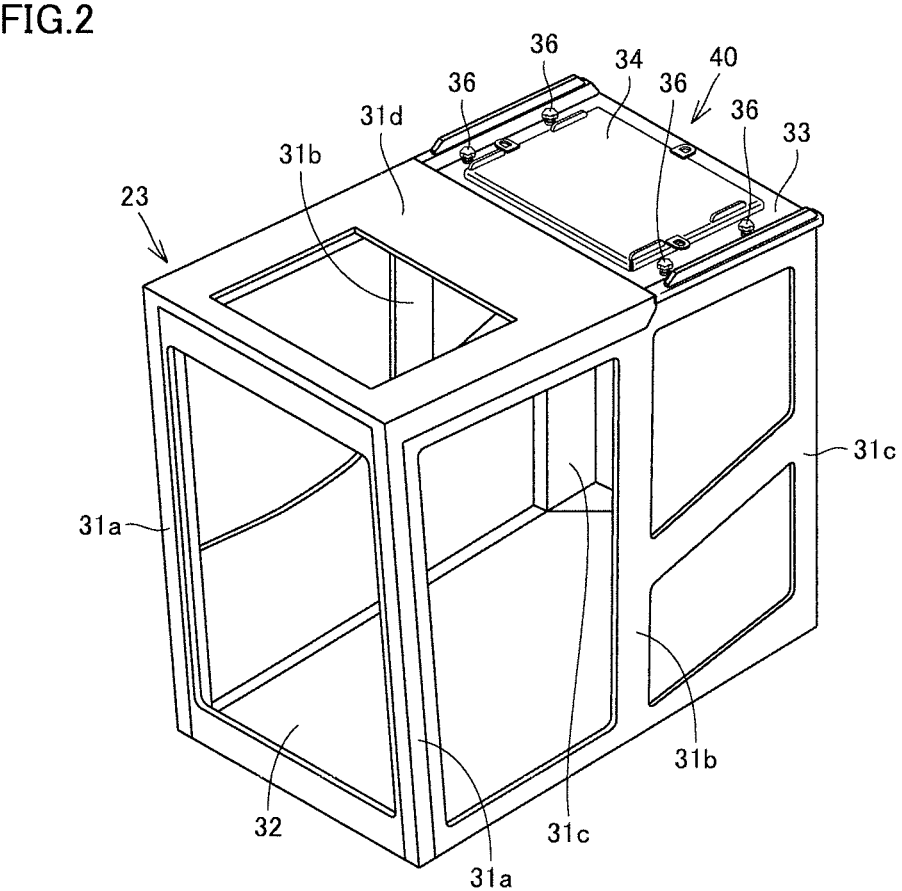
FIG. 2 is a partial enlarged perspective view showing an operator's compartment of the feller buncher of FIG. 1.

FIG. 1 is a perspective view schematically showing a configuration of a feller buncher as an example of a work machine in one embodiment of the present invention. FIG. 2 is a partial enlarged perspective view showing an operator's compartment in the feller buncher of FIG. 1.

As shown in FIG. 1, a feller buncher 30 mainly has a traveling unit 20, a revolving unit 22, and a work implement 25. A body of the work machine is composed of traveling unit 20 and revolving unit 22.

Traveling unit 20 has a pair of right and left crawler belt apparatuses 21. The paired right and left crawler belt apparatuses 21 each has a crawler belt. The pair of right and left crawler belt apparatuses 21 is rotatably driven so that feller buncher 30 is self-propelled.

Revolving unit 22 is provided to be revolvable as desired relative to traveling unit 20. This revolving unit 22 mainly has an operator's compartment 23, an engine compartment 24, etc.

Operator's compartment 23 is disposed for example on a right-hand side of revolving unit 22, and engine compartment 24 is disposed for example on a left-hand side of revolving unit 22. An operator's seat 23a is disposed in an internal space 32 of operator's compartment 23. Engine compartment 24 has accommodated an engine unit (such as an engine, an exhaust gas processing structure, etc.) therein. An engine hood covers the upper part of engine compartment 24.

Work implement 25 is axially supported rearwardly of revolving unit 22. Work implement 25 has a boom 26, a dipper stick 27, a feller buncher device 28, hydraulic cylinders 29a and 29b, etc., for example. A proximal end of boom 26 is rotatably coupled to revolving unit 22. A proximal end of dipper stick 27 rotatably is coupled to a distal end of boom 26. Feller buncher device 28 is coupled to a distal end of dipper stick 27. Boom 26 and dipper stick 27 can each be driven by hydraulic cylinders 29a and 29b. In feller buncher 30, operator's compartment 23 may be disposed on the left side of revolving unit 22, engine compartment 24 may be disposed on the back side of revolving unit 22, and work implement 25 may be axially supported on the right side of operator's compartment 23 by revolving unit 22.

Feller buncher device 28 is configured to be capable for example of cutting trees and cutting off branches and the like. Feller buncher device 28 includes a chain saw for cutting trees and a movable knife and a stationary knife for cutting off branches.

As shown in FIG. 2, operator's compartment 23 has one pair of front pillars 31a, one pair of center pillars 31b, one pair of rear pillars 31c, and a roof portion 31d. Each pillar 31a, 31b, 31c is disposed such that its longitudinal direction extends in a vertical direction. Front pillar 31a, center pillar 31b, and rear pillar 31c, are disposed from a front side of operator's compartment 23 toward a rear side thereof in this order side by side. Roof portion 31d is disposed at an upper portion of operator's compartment 23 and is supported by the plurality of pillars 31a, 31b, 31c. Operator's compartment 23 has an internal space 32. This internal space 32 is surrounded by the plurality of pillars 31a, 31b, 31c and roof portion 31d. Operator's seat 23a (see FIG. 1) is disposed in internal space 32 of operator's compartment 23. An operator can operate work machine 30 in a position in which he/she is seated on operator's seat 23a.

Roof portion 31d is provided with an emergency escape module 40. Emergency escape module 40 configures an escapeway for an operator who is operating work machine 30 in internal space 32 of operator's compartment 23 to escape to an external space external to operator's compartment 23 in an emergency.

Note that in the present embodiment, work machine 30 has front and rear, and right and left sides with reference to an operator seated on operator's seat 23a of operator's compartment 23. A direction which is opposite to the operator seated on operator's seat 23a is the front side, and a direction opposite to the front side is the rear side. The right side is a right side of the operator seated on operator's seat 23a facing frontward, and the left side is a left side of the operator seated on operator's seat 23a facing frontward. A side closer to the feet of the operator seated on operator's seat 23a is a lower side and a side closer to the head of the operator seated on operator's seat 23a is an upper side.

A configuration of each member which configures the above emergency escape module 40 will now be described using FIG. 3-FIG. 5.

Figure 3:
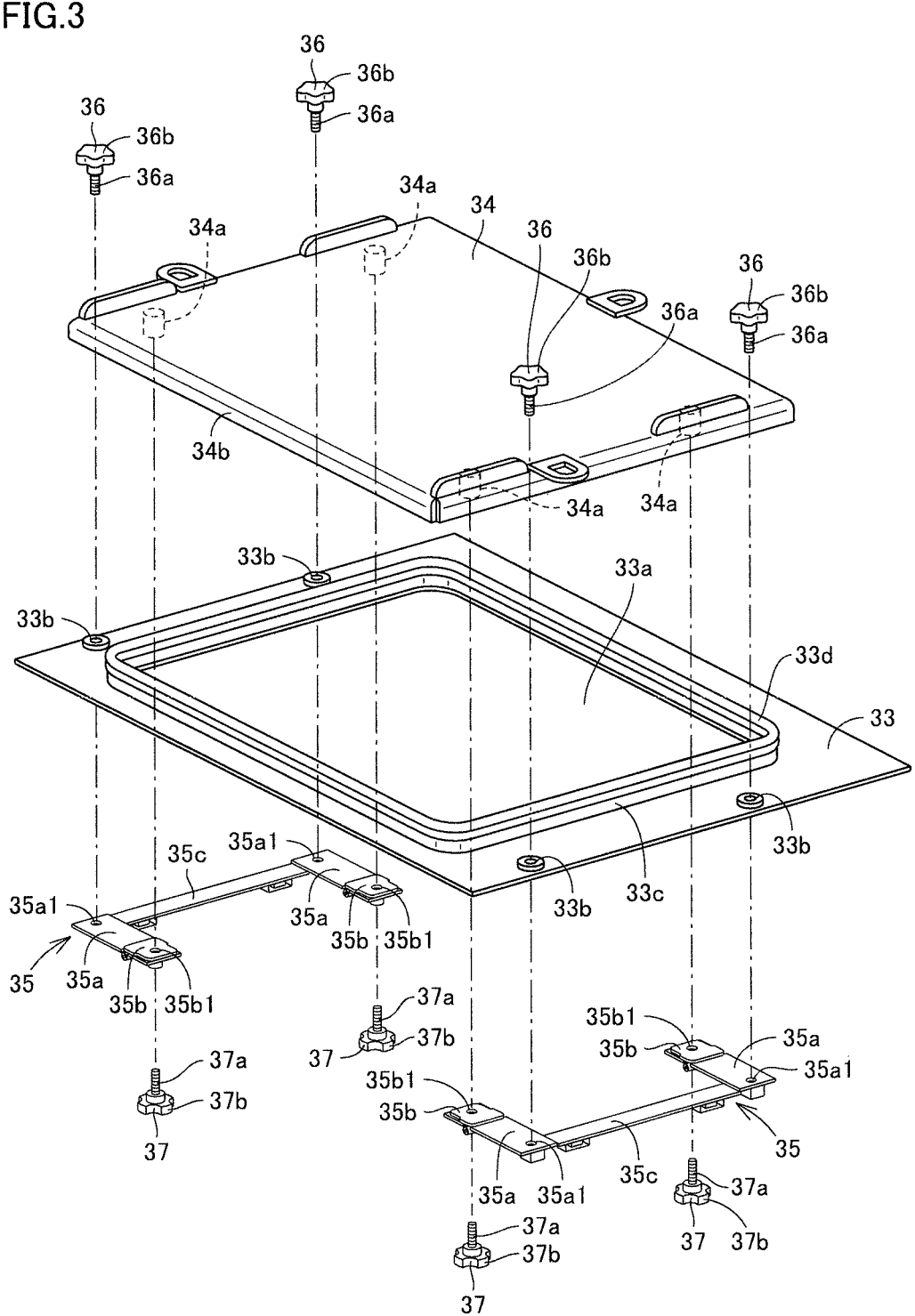
FIG. 3 is an exploded perspective view schematically showing a configuration of an emergency escape module provided to the operator's compartment shown in FIG. 2.

FIG. 3 is an exploded perspective view schematically showing a configuration of emergency escape module 40 in operator's compartment 23 shown in FIG. 2. FIGS. 4 and 5 are perspective views of support member 35 used for emergency escape module 40 shown in FIG. 3, as seen from above and below, respectively.

As shown in FIG. 3, emergency escape module 40 has an opening member 33, a panel 34, a pair of support members 35, a plurality of fixing members (a first fixing member) 36, and a plurality of fixing members (a second fixing member) 37.

Opening member 33 configures a portion of roof portion 31d (see FIG. 2) of operator's compartment 23. Opening member 33 is a member in the form of a frame having an opening 33a. Opening 33a penetrates opening member 33 and connects internal space 32 of operator's compartment 23 and an external space external thereto.

Opening 33a is a portion serving as an emergency escapeway. This opening 33a is configured such that an operator can exit from internal space 32 via opening 33a to an external space external to operator's compartment 23.

Opening member 33 has a projecting edge 33c projecting upwards. Projecting edge 33c is located along the entire periphery of opening 33a and defines a planar shape of opening 33a in a plan view. Note that herein a plan view means a viewpoint in a direction perpendicular to an upper surface of roof portion 31d (or opening member 33) of operator's compartment 23.

Opening member 33 is provided with a seal member 33d. This seal member 33d is disposed for example at an upper end of projecting edge 33c along the entire periphery. This seal member 33d seals between panel 34 and opening members 33, and prevents water from entering internal space 32 from the external space external to operator's compartment 23.

Opening member 33 has a plurality of (e.g., four) throughholes 33b. The plurality of throughholes 33b are disposed to sandwich opening 33a. More specifically, for example, two throughholes 33b are disposed at one side of opening 33a and two throughholes 33b are disposed at the other side of opening 33a.

Panel 34 has a shape which can cover the entirety of opening 33a from above opening member 33. Panel 34 for example has a rectangular shape larger than an opening shape (a planar shape) of opening 33a. Panel 34 has an outer peripheral end with a pendency portion 34b extending downward. Pendency portion 34b is provided at the entirety of the outer periphery of the panel. Panel 34 is formed of sheet metal. Panel 34 may be a transparent member such as acrylic glass.

Panel 34 has a plurality of (e.g., four) projections 34a. The plurality of projections 34a are each provided to extend downward from a lower surface of panel 34. An internally threaded portion 34a1 (see FIG. 7) is formed at a lower end surface of each of the plurality of projections 34a. Four projections 34a are each disposed near one of the four corners of rectangular panel 34.

Support member 35 is disposed under opening member 33. Support member 35 is provided to attach and thus fix panel 34 to opening member 33.

Figure 4:
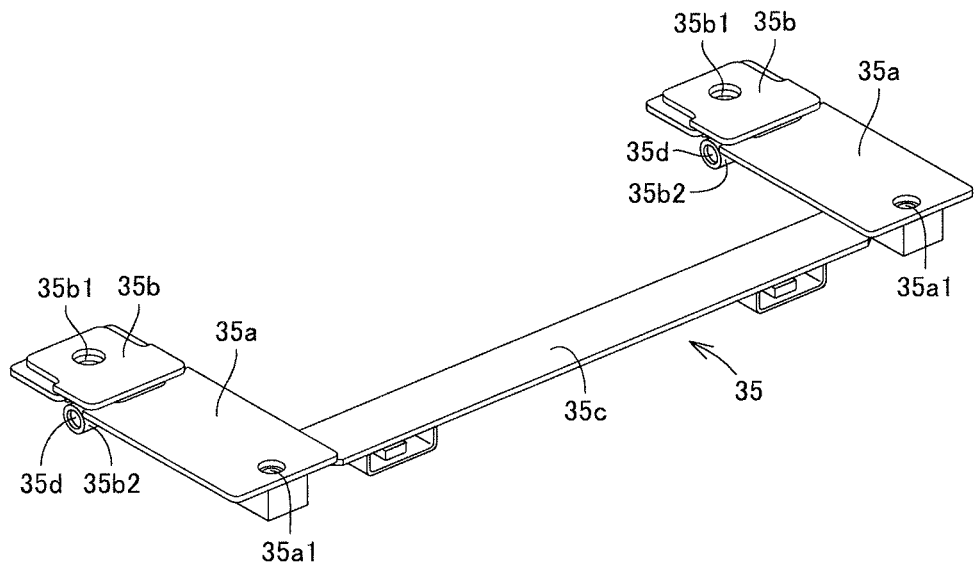
FIG. 4 is a perspective view of a support member used for the emergency escape module shown in FIG. 3, as seen from above.
Figure 5:
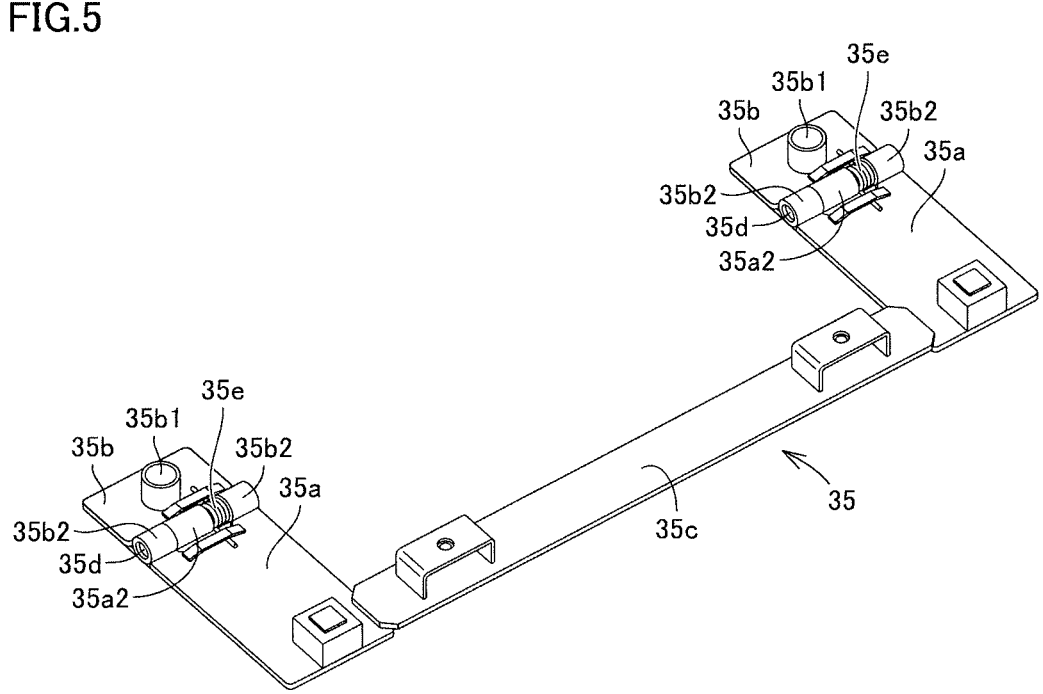
FIG. 5 is a perspective view of the support member used for the emergency escape module shown in FIG. 3, as seen from below.

As shown in FIG. 4 and FIG. 5, support member 35 has a pair of first wing plates (a first member) 35a, a pair of second wing plates (a second member) 35b, a coupling plate 35c, a pair of coupling rods 35d, and a pair of springs 35e (a spring member: FIG. 5).

The pair of first wing plates 35a each have one end with internally threaded portion 35a1 (see FIG. 4) and the other end with a cylindrical rod insertion portion 35a2 (see FIG. 5). The pair of first wing plates 35a have their respective one ends coupled to each other by coupling plate 35c. The pair of second wing plates 35b each have a center portion with a throughhole 35b1 and an end with a cylindrical rod insertion portion 35b2.

Rod insertion portion 35a2 of first wing plate 35a and rod insertion portion 35b2 of second wing plate 35b are disposed coaxially. Common coupling rod 35d is inserted through both coaxially disposed rod insertion portion 35a2 and rod insertion portion 35b2. Thus first wing plate 35a and second wing plate 35b are coupled to be pivotable relative to each other about coupling rod 35d. Furthermore, a coupling portion of first wing plate 35a and second wing plate 35b is composed of rod insertion portion 35a2, rod insertion portion 35b2, and coupling rod 35d.

The pair of springs 35e are each composed of a coil spring, for example. Cooping rod 35d is inserted inside a coiled portion of coil spring 35e. One end of coil spring 35e is fixed to first wing plate 35a, and the other end of coil spring 35e is fixed to second wing plate 35b. Thus, first wing plate 35a and second wing plate 35b are mutually biased in a direction in which first wing plate 35a and second wing plate 35b pivot about coupling rod 35d.

When one wing plate of first wing plate 35a and second wing plate 35b is fixed to panel 34 or opening member 33, the pivot direction biased by coil spring 35e is a direction in which the other wing plate moves toward internal space 32 of operator's compartment 23. More specifically, the other wing plate has a coupling-side end coupled with one wing plate and a pivoting-side end opposite to the coupling-side end, and first wing plate 35a and second wing plate 35b are biased by coil spring 35e so that the pivoting-side end may move in a direction away from panel 34 or opening member 33 (a downward direction in FIG. 9 and FIG. 11). Accordingly, whatever position work machine 30 may assume (e.g. when work machine 30 is tipped over), the unfixed wing plate moves toward internal space 32 of operator's compartment 23 and panel 34 can thus be easily removed from operator's compartment 23.

As shown in FIG. 3, fixing member 36 has a shank 36a configuring an externally threaded portion and a grip portion 36b serving as a head. Shank 36a of fixing member 36 can be screwed from an external space external to operator's compartment 23 via throughhole 33b of opening member 33 into internally threaded portion 35a1 of first wing plate 35a.

Furthermore, fixing member 37 has a shank 37a configuring an externally threaded portion and a grip portion 37b serving as a head. Shank 37a of fixing member 37 can be screwed from internal space 32 of operator's compartment 23 via throughhole 35b1 of second wing plate 35b into internally threaded portion 34a1 of panel 34 (see FIG. 7).

As described above, fixing member 36 can be screwed into internally threaded portion 35a1 of first wing plate 35a and fixing member 37 can be screwed into internally threaded portion 34a1 of panel 34 (see FIG. 7) to attach and thus fix panel 34 to opening member 33. With panel 34 attached to opening member 33, opening member 33 can have opening 33a closed as shown in FIG. 2.

Hereinafter reference will be made to FIG. 2, FIG. 3 and FIG. 6 to FIG. 8 to describe a state of emergency escape module 40 with opening 33a closed by panel 34.

Figure 6:
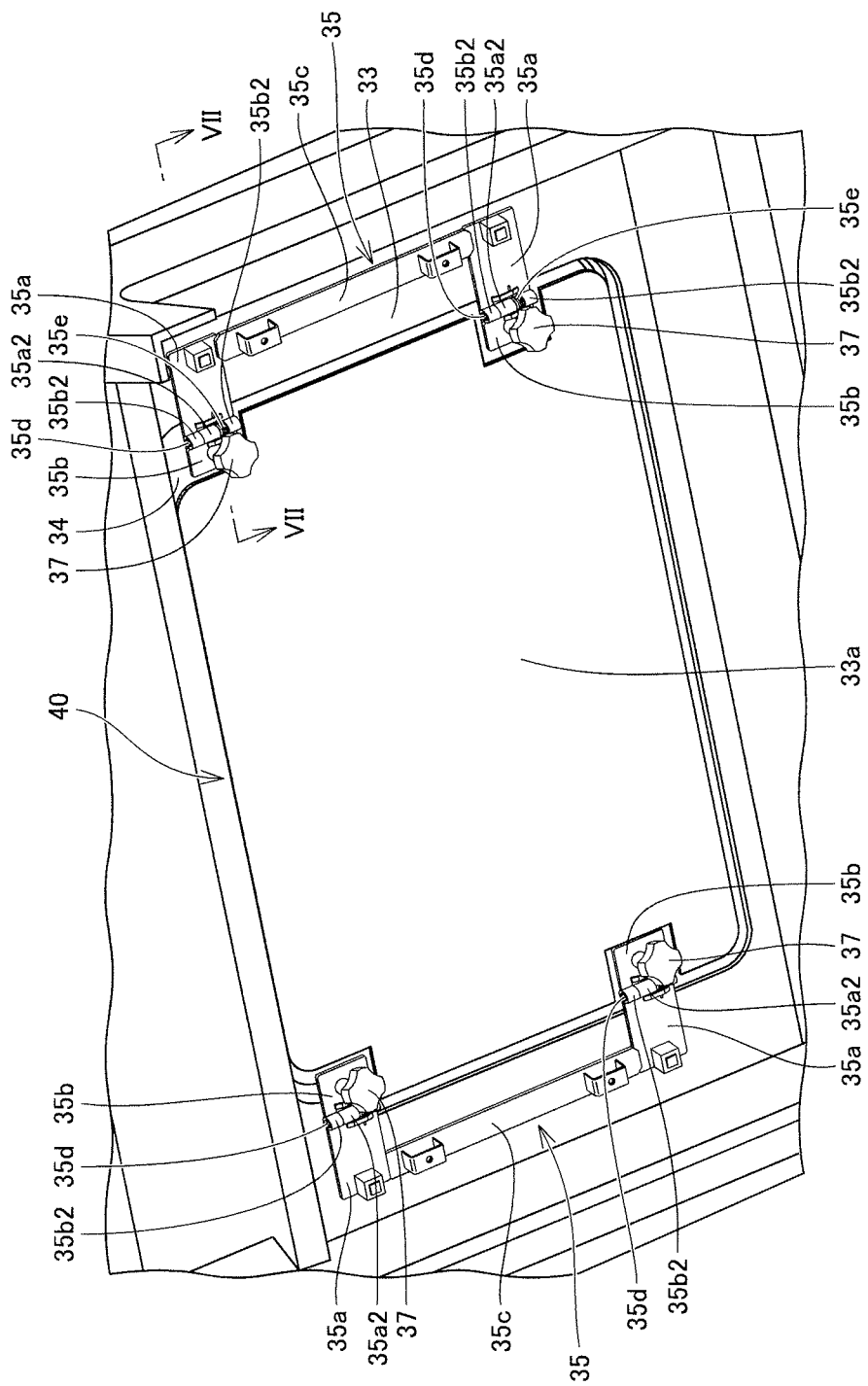
FIG. 6 is a perspective view schematically showing a configuration in a vicinity of the emergency escape module in the operator's compartment shown in FIG. 2, as seen inside the operator's compartment.
Figure 7:
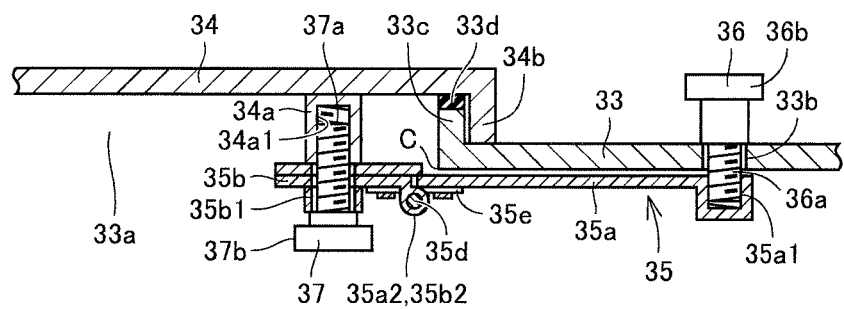
FIG. 7 is a schematic cross section along a line VII-VII of FIG. 6.
Figure 8:
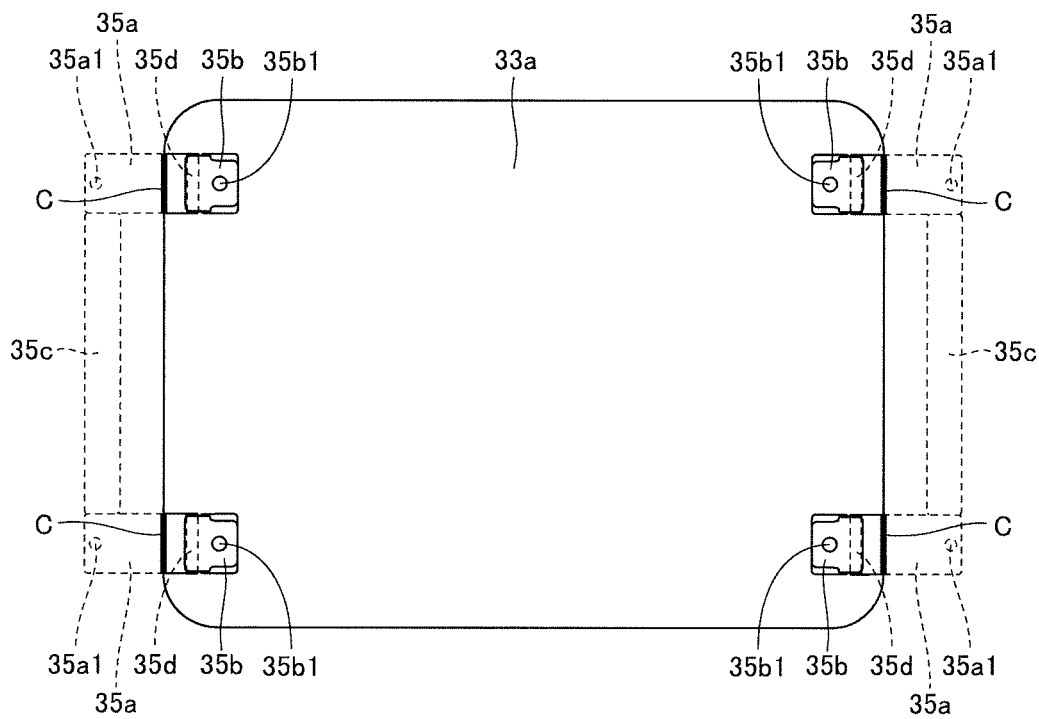
FIG. 8 is a plan view for illustrating a positional relationship between a coupling portion of a first wing plate of a support member and a second wing plate of a support member, and an opening.

FIG. 6 is a perspective view schematically showing a configuration in a vicinity of emergency escape module 40 in operator's compartment 23 shown in FIG. 1, as seen from inside of operator's compartment 23, and FIG. 7 is a schematic cross section along a line VII-VII of FIG. 6. FIG. 8 is a plan view for illustrating a positional relationship between a coupling portion of first wing plate 35a of support member 35 and second wing plate 35b of support member 35, and opening 33a.

As shown in FIG. 2 and FIG. 3, when opening 33a is closed by panel 34, panel 34 is disposed such that opening 33a is covered therewith from an external space external to operator's compartment 23 (or from above). In this state, pendency portion 34b of panel 34 is disposed to surround the outer periphery of projecting edge 33c of opening member 33.

As shown in FIG. 3 and FIG. 6, support member 35 is disposed in internal space 32 of operator's compartment 23. Support member 35 has first wing plate 35a and coupling plate 35c both located directly under a frame portion of opening member 33. In contrast, support member 35 has second wing plate 35b located directly under opening 33a.

More specifically, as shown in FIG. 8, in a plan view, second wing plate 35b is located in opening 33a. Furthermore, the coupling portion (rod insertion portion 35a2, rod insertion portion 35b2, and coupling rod 35d) of first wing plate 35a and second wing plate 35b is also located in opening 33a.

As shown in FIG. 7, shank 36a of fixing member 36 is screwed from an external space external to operator's compartment 23 via throughhole 33b of opening member 33 into internally threaded portion 35a1 of first wing plate 35a. Thus fixing member 36 fixes first wing plate 35a of support member 35 to opening member 33 (or the operator's compartment) from an external space external to operator's compartment 23.

By removing shank 36a of fixing member 36 from internally threaded portion 35a1 of first wing plate 35a, first wing plate 35a of support member 35 and opening member 33 (or the operator's compartment) can be unfixed.

The head of fixing member 36, or grip portion 36b, is located in an external space external to operator's compartment 23. Accordingly, by rotating grip portion 36b of fixing member 36 in the external space external to operator's compartment 23, first wing plate 35a of support member 35 and opening member 33 (or the operator's compartment) can be unfixed in the external space external to operator's compartment 23.

Shank 37a of fixing member 37 is screwed from internal space 32 of operator's compartment 23 via throughhole 35b1 of second wing plate 35b into internally threaded portion 34a1 of projection 34a of panel 34. Thus fixing member 37 fixes second wing plate 35b of support member 35 to panel 34 from the internal space 32 of operator's compartment 23.

By removing shank 37a of fixing member 37 from internally threaded portion 34a1 of projection 34a of panel 34, second wing plate 35b of support member 35 and panel 34 can be unfixed.

The head of fixing member 37, or grip portion 37b, is located in internal space 32 of operator's compartment 23. Accordingly, by rotating grip portion 37b of fixing member 37 in internal space 32 of operator's compartment 23, second wing plate 35b of support member 35 and panel 34 can be unfixed in internal space 32 of operator's compartment 23.

Thus, panel 34 is attached and thus fixed to opening member 33 (or operator's compartment 23) via support member 35. Panel 34 and support member 35 are fixed to each other by fixing member 37, and support member 35 and opening member 33 are fixed to each other by fixing member 36. Fixing member 36 and first wing plate 35a are screwed and thus coupled together and thus fixed to each other, and fixing member 37 and panel 34 are screwed and thus coupled together and thus fixed to each other.

Note that when panel 34 is attached and thus fixed to opening member 33, seal member 33d abuts against a lower surface of panel 34 such that it surrounds the entire periphery of opening 33a.

Hereinafter a reference will be made to FIGS. 7 and 9-12 to describe an operation of emergency escape module 40 performed to open the opening of operator's compartment 23 from a closed position.

Figure 9:
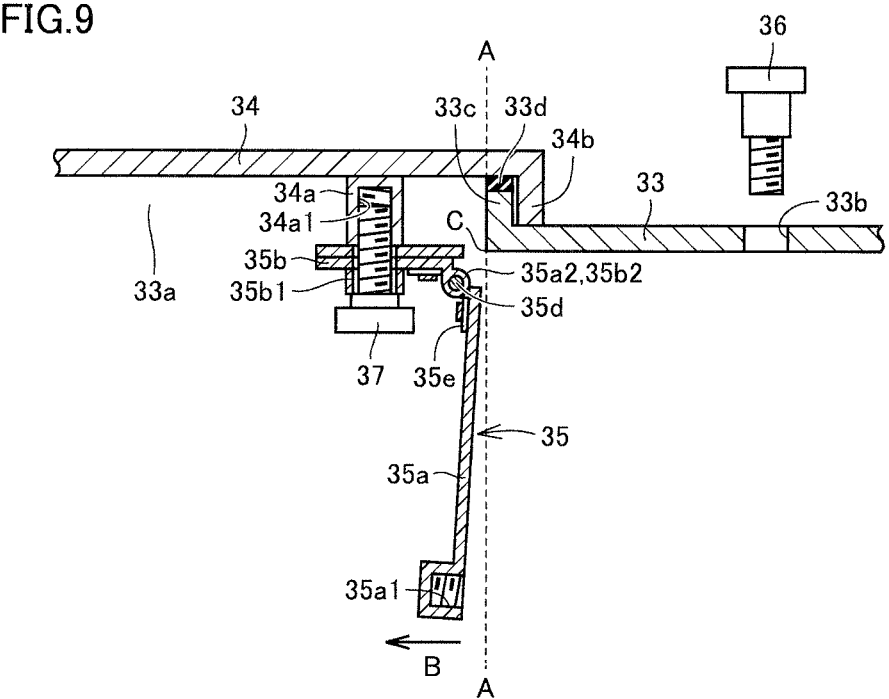
FIG. 9 is a cross section showing a first step of an operation which opens an opening in the emergency escape module shown in FIG. 3 from an external space external to the operator's compartment.
Figure 10:
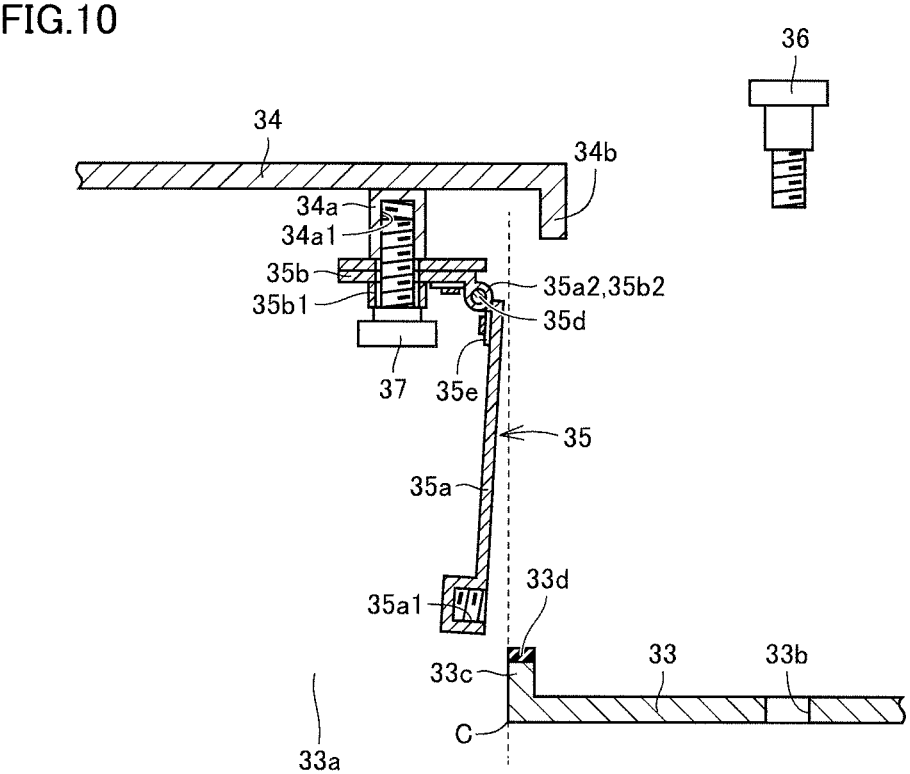
FIG. 10 is a cross section showing a second step of the operation which opens the opening in the emergency escape module shown in FIG. 3 from the external space external to the operator's compartment.
Figure 11:
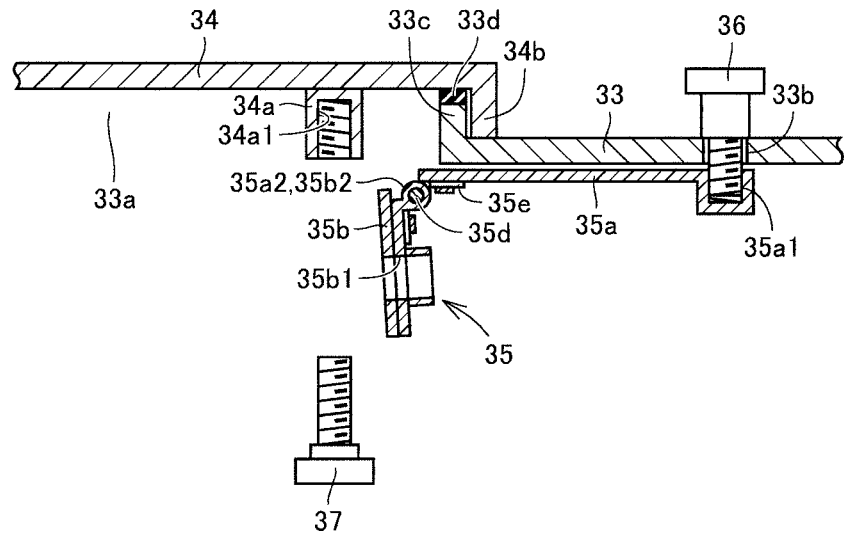
FIG. 11 is a cross section showing a first step of an operation which opens the opening in the emergency escape module shown in FIG. 3 from an internal space of the operator's compartment.
Figure 12:
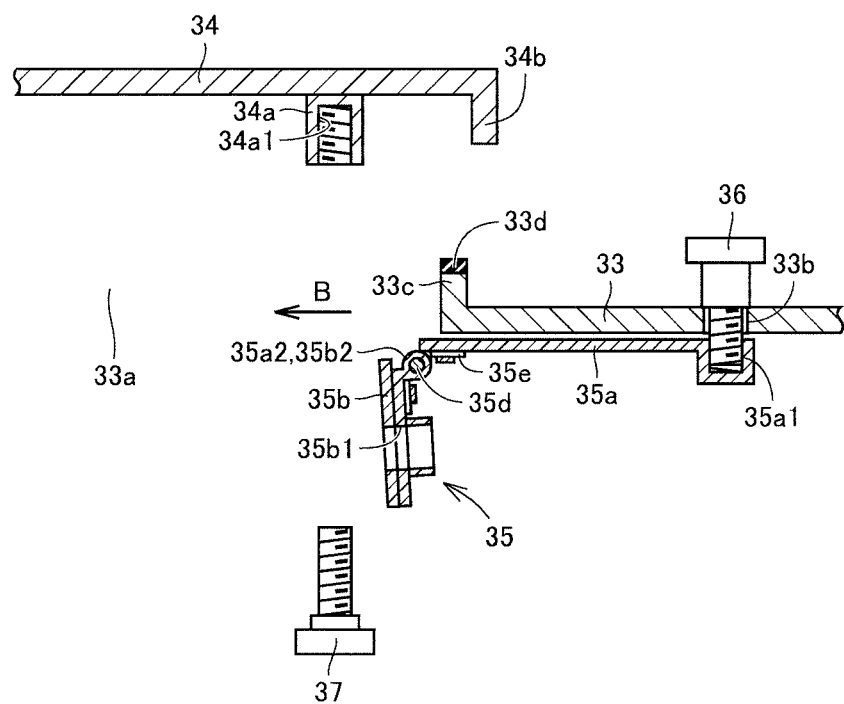
FIG. 12 is a cross section showing a second step of the operation which opens the opening in the emergency escape module shown in FIG. 3 from the internal space of the operator's compartment.

FIGS. 9 and 10 are cross sections showing in an order of steps an operation of emergency escape module 40 in the present embodiment to open opening 33a from outside operator's compartment 23. FIGS. 11 and 12 are cross sections showing in an order of steps an operation of emergency escape module 40 in the present embodiment to open the opening from inside operator's compartment 23.

As shown in FIG. 7, when the emergency escapeway is opened from an external space external to operator's compartment 23, grip portion 36b of fixing member 36 is rotated and thus operated in the external space. Thus shank 36a of fixing member 36 is removed from internally threaded portion 35a1 of first wing plate 35a.

As shown in FIG. 9, when fixing member 36 is removed from first wing plate 35a, first wing plate 35a pivots about coupling rod 35*d* relative to second wing plate 35*b* as coil spring 35*e* exerts a biasing force. Thus first wing plate 35*a* pivots so that first wing plate 35*a* has one end located at a side opposite to panel 34 with second wing plate 35*h* interposed (in the figure, downwards). In this state, first wing plate 35*a* is located inner than an edge of opening 33*a* (in the figure, a broken line A-A) and thus inside opening 33*a* (in the figure, a side indicated by an arrow B).

Herein, edge A-A means, as shown in FIG. 7, with support member 35 having first wing plate 35*a* fixed to opening member 33, an edge of opening 33*a* at a portion C located exactly above first wing plate 35*a* (portion C indicated in FIG. 8 by a thick line). Furthermore, first wing plate 35*a* being located inside opening 33*a* (in the figure, the side indicated by arrow B) means that, as shown in FIG. 9, first wing plate 35*a* is located closer to second wing plate 35*b* than a virtual straight line A-A extending along and exactly under edge portion C. Furthermore, first wing plate 35*a* being located inside opening 33*a* (in the figure, the side indicated by arrow B) means that, as shown in FIG. 8, in a plan view, first wing plate 35*a* is located inside opening 33*a*.

By removing fixing member 36 from first wing plate 35*a*, as described above, first wing plate 35*a* of support member 35 and opening member 33 (or the operator's compartment) are unfixed.

As shown in FIG. 10, panel 34 is removed from opening member 33 (or operator's compartment 23). At the time, support member 35 has first wing plate 35*a* located inner than edge A-A of opening 33*a* and thus first wing plate 35*a* can be prevented from interfering with opening member 33. Thus, first wing plate 35*a* can be extracted through opening 33*a*.

Thus the emergency escapeway can be opened from an external space external to operator's compartment 23.

As shown in FIG. 7, when the emergency escapeway is opened from internal space 32 of operator's compartment 23, grip portion 37*b* of fixing member 37 is rotated and thus operated in internal space 32. Thus shank 37*a* of fixing member 37 is removed from internally threaded portion 34*a*1 of projection 34*a* of panel 34.

As shown in FIG. 11, when fixing member 37 is removed from panel 34, second wing plate 35*b* pivots about coupling rod 35*d* relative to first wing plate 35*a* as coil spring 35*e* exerts a biasing force. Thus second wing plate 35*b* pivots so that second wing plate 35*b* has a tip located at a side opposite to panel 34 with first wing plate 35*a* interposed (in the figure, downwards).

By removing fixing member 37 from panel 34, as described above, second wing plate 35*b* of support member 35 and panel 34 are unfixed.

As shown in FIG. 12, panel 34 is removed from opening member 33 (or operator's compartment 23). At the time, support member 35 is removed from panel 34, and accordingly, panel 34 is alone removed from opening member 33 (or operator's compartment 23).

Furthermore, as second wing plate 35*b* has pivoted relative to first wing plate 35*a*, a dimension projecting inside opening 33*a* (in the figure, in the direction of arrow B) can be smaller than when second wing plate 35*b* is aligned with first wing plate 35*a* in a straight line (see FIG. 7). This ensures that opening 33*a* has a large opening area to help the operator to escape through opening 33*a*.

Thus opening 33*a* can be opened from internal space 32 of operator's compartment 23. Thus the operator can exit from internal space 32 of operator's compartment 23 via opening 33*a* to an external space.

Furthermore, opening 33*a* can be closed by panel 34 by an operation done in a procedure opposite to the operation described above to open the opening.

Hereinafter, a function and effect of the present embodiment will be described in comparison with a comparative example.

According to the present embodiment, as shown in FIG. 7, fixing member 36 fixes first wing plate 35*a* to opening member 33 from an external space external to operator's compartment 23. Accordingly, by removing fixing member 36 from first wing plate 35*a* in the external space, first wing plate 35*a* and opening member 33 can be unfixed, as shown in FIG. 9, and panel 34 can be removed from opening member 33 (or operator's compartment 23), as shown in FIG. 10.

Furthermore, as shown in FIG. 7, fixing member 37 fixes panel 34 to second wing plate 35*b* from internal space 32 of operator's compartment 23. Accordingly, by removing fixing member 37 from panel 34 in internal space 32, second wing plate 35*b* and panel 34 can be unfixed, as shown in FIG. 11, and panel 34 can be removed from opening member 33 (or operator's compartment 23), as shown in FIG. 12.

Thus, an operation to attach/remove panel 34 to/from operator's compartment 23 can be done from both internal space 32 of operator's compartment 23 and an external space external thereto.

Furthermore, for example, a comparative example is also considered in which an outer frame portion along a peripheral edge of opening 33*a* is attached to opening member 33 so as to be located in opening 33*a* and in that condition the opening inside the outer frame portion is opened and closed by panel 34. In this comparative example, however, the opening inside the outer frame portion has an opening area smaller than that of opening 33*a*. As such, it is difficult to allow a small occupied area occupied by the emergency escape module to ensure that the opening inside has a large opening area.

In contrast, the present embodiment provides a simple configuration in which panel 34 is disposed to be capable of opening and closing opening 33*a* and an outer frame portion is not required as in the comparative example, which facilitates allowing a small occupied area to ensure a prescribed opening dimension.

Furthermore, in the above comparative example, an outer frame portion is attached to opening member 33, and panel 34 is attached to the outer frame portion. Accordingly, a seal member is required between opening member 33 and the outer frame portion as well as between the outer frame portion and panel 34 for a total of at least two locations. This facilitates water to enter internal space 32 of operator's compartment 23.

In contrast, in the present embodiment, sealing one location, i.e., between panel 34 and operator's compartment 23, as shown in FIG. 7 can prevent water from entering internal space 32 of operator's compartment 23 via opening 33*a*.

Furthermore, in the present embodiment, coil spring 35*e* biases first wing plate 35*a* and second wing plate 35*b* in a direction allowing them to pivot. Accordingly, by removing fixing member 36 from first wing plate 35*a*, as shown in FIG. 9, first wing plate 35*a* pivots relative to second wing plate 35*b*. Thus, as shown in FIG. 10, when panel 34 is attached to operator's compartment 23, and removed therefrom, first wing plate 35*a* can be prevented from interfering with operator's compartment 23.

Furthermore, as shown in FIG. 11, by removing fixing member 37 from panel 34, second wing plate 35*b* pivots relative to first wing plate 35*a*. Thus, as shown in FIG. 12, a tip of second wing plate 35b pivots to face downward, and a dimension projecting inside opening 33a (in the figure, in the direction of arrow B) can be smaller than when second wing plate 35b is aligned with first wing plate 35a in a straight line (see FIG. 7). This ensures that opening 33a has a large opening area to help the operator to escape through opening 33a.

Furthermore, in the present embodiment, as shown in FIG. 8, in a plan view, a coupling portion (rod insertion portion 35a2, rod insertion portion 35b2, and coupling rod 35d of first wing plate 35a and second wing plate 35b is located in opening 33a. Thus, as shown in FIGS. 9 and 10, when panel 34 is removed from operator's compartment 23, first wing plate 35a can be prevented from interfering with opening member 33.

Furthermore, in the present embodiment, as shown in FIG. 7, fixing member 37 and panel 34 are fixed to each other by screw connection, and fixing member 36 and first wing plate 35a are fixed to each other by screw connection. The screw connection ensures and also simplifies fixing.

Furthermore, the screw connection allows an operation in an emergency for an escape to be done by a simple and rapid as well as reliable operation.

Furthermore, in the present embodiment, head 36b of fixing member 36 is located in an external space external to operator's compartment 23, and head 37b of fixing member 37 is located in internal space 32 of operator's compartment 23. Accordingly, an operation to attach/remove panel 34 to/from operator's compartment 23 can be done from both internal space 32 of operator's compartment 23 and an external space external thereto.

Figure 13:
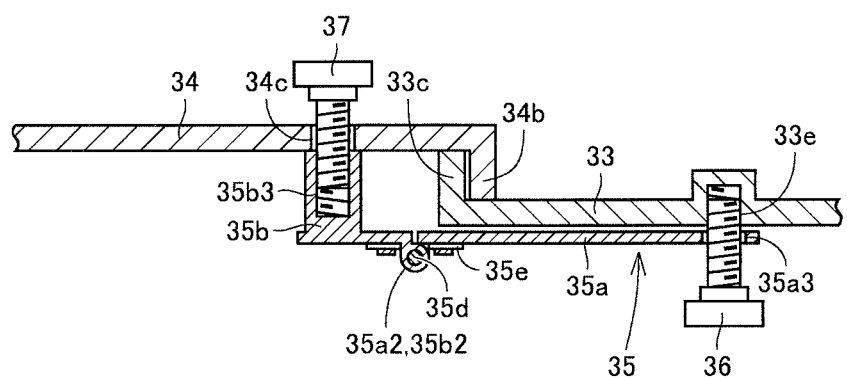
FIG. 13 is a cross section corresponding to the cross section of FIG. 7 and showing a configuration of an exemplary variation of the operator's compartment.

Note that while the above embodiment has been described for a case in which, as shown in FIG. 7, panel 34 is fixed to support member 35 from internal space 32 of operator's compartment 23 and opening member 33 is fixed to support member 35 from an external space external to operator's compartment 23, the present invention is not limited to thereto, and for example it may have a configuration shown in FIG. 13. FIG. 13 is a cross section corresponding to the cross section of FIG. 7 and showing a configuration of an exemplary variation of operator's compartment 23.

As shown in FIG. 13, opening member 33 is fixed from internal space 32 of operator's compartment 23 by fixing member 36 (the first fixing member) to first wing plate 35a (the first member) of support member 35, and panel 34 is fixed from an external space external to operator's compartment 23 by fixing member 37 (the second fixing member) to second wing plate 35b (the second member) of support member 35.

In this configuration, first wing plate 35a is provided with throughhole 35a3, and opening member 33 is provided with internally threaded portion 33e. Fixing member 36 is screwed from internal space 32 of operator's compartment 23 via throughhole 35a3 of first wing plate 35a into internally threaded portion 33e of opening member 33.

Furthermore, panel 34 is provided with throughhole 34c, and second wing plate 35b is provided with internally threaded portion 35b3. Fixing member 37 is screwed from an external space external to operator's compartment 23 via throughhole 34c of panel 34 into internally threaded portion 35b3 of second wing plate 35b.

Note that the remainder in configuration of FIG. 13 other than the above is substantially identical to the configuration shown in FIG. 2-FIG. 8, and accordingly, identical components are identically denoted and will not be described repeatedly. Furthermore, while in the present embodiment, a configuration has been described in which first wing plate 35a and second wing plate 35b are mutually pivotably coupled, coupling first wing plate 35a and second wing plate 35b to have their mutual positional relationship variably suffices. More specifically, first wing plate 35a and second wing plate 35b may be coupled to each other by a member, such as a wire, a chain, or a string.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. An operator's compartment of a work machine, comprising:
    an operator's compartment having an internal space and an opening connecting the internal space to an external space external to the operator's compartment;
    a panel disposed at the opening;
    a support member having a first member and a second member coupled with the first member to be able to change a positional relationship with respect to the first member;
    a first fixing member that is capable of fixing the first member to the operator's compartment from one of the internal space of the operator's compartment and the external space and is capable of releasing a fixing state between the first member and the operator's compartment by being removed from the operator's compartment and the first member; and
    a second fixing member that is capable of fixing the second member to the panel from the other of the internal space of the operator's compartment and the external space and is capable of releasing a fixing state between the second member and the panel by being removed from the panel and the second member.

2. The operator's compartment of the work machine according to claim 1, wherein:
    the first member and the second member are pivotably coupled together;
    the support member has a spring member; and
    the spring member biases the first member and the second member in a direction allowing the first and second members to pivot.

3. The operator's compartment of the work machine according to claim 1, wherein a coupling portion of the first member and the second member is located in the opening in a plan view.

4. The operator's compartment of the work machine according to claim 1, wherein the first fixing member and the first member are fixed to each other by screw connection, and the second fixing member and the panel are fixed to each other by screw connection.

5. The operator's compartment of the work machine according to claim 4, wherein:
    the first fixing member fixes the first member to the operator's compartment from the external space external to the operator's compartment;
    the second fixing member fixes the second member to the panel from the internal space of the operator's compartment; and
    a head of a screw of the first fixing member is located in the external space external to the operator's compartment and a head of a screw of the second fixing member is located in the internal space of the operator's compartment.

6. A work machine comprising:
an operator's compartment of a work machine according to claim 1; and
a work implement.

* * * * *